United States Patent [19]

Vahlberg et al.

[11] Patent Number: 4,557,458

[45] Date of Patent: Dec. 10, 1985

[54] ANTI-THEFT DEVICE FOR OUTBOARD MOTORS

[76] Inventors: Christer Vahlberg, Plöjargränd 57, S-263 00 Höganäs; Odd Hielm, Backgatan 16, S-310 31 Eldsberga, both of Sweden

[21] Appl. No.: 582,214

[22] Filed: Feb. 21, 1984

[30] Foreign Application Priority Data

Feb. 24, 1983 [SE] Sweden ............................... 8301016

[51] Int. Cl.[4] ............................................... A01K 97/10

[52] U.S. Cl. ......................................... 248/553; 70/58; 70/232; 248/640

[58] Field of Search ............... 248/553, 551, 640, 641, 248/642, 643; 70/58, 14, 232, 230, 56, DIG. 58, DIG. 56

[56] References Cited

U.S. PATENT DOCUMENTS

| | | | |
|---|---|---|---|
| 2,529,432 | 11/1950 | Tenner . | |
| 3,254,891 | 6/1966 | Brown | 248/553 |
| 3,650,130 | 3/1972 | Thompson | 70/58 |
| 3,731,504 | 5/1973 | Belknap | 70/58 |
| 3,889,500 | 6/1975 | Hix et al. | 70/232 |
| 3,893,312 | 7/1975 | Johnson | 70/58 |
| 4,030,324 | 6/1977 | Rizio | 70/232 |
| 4,058,994 | 11/1977 | Coppola | 70/232 |
| 4,144,729 | 3/1979 | Nielsen | 70/232 |
| 4,228,983 | 10/1980 | Bowman | 248/553 |
| 4,306,703 | 12/1981 | Finze | 248/642 |
| 4,325,701 | 4/1982 | Peters | 70/232 |

*Primary Examiner*—Ramon S. Britts
*Assistant Examiner*—Ramon O. Ramirez
*Attorney, Agent, or Firm*—Karl W. Flocks; Sheridan Neimark

[57] ABSTRACT

An anti-theft device for clamping and locking an outboard motor to a transom board comprises a bracket forming together with an upper part of the outboard motor a substantially U-shaped suspension rack for mounting the outboard motor on the outboard transom side, and a free leg of the bracket extending downwardly along the inboard transom side. also included is a clamping fixture in the form of a jack screw including a hollow body and a clamping screw for urging the free leg away from the inboard side, while clamping the motor to the outboard side. The hollow body forms a protective housing having openings in its walls for receiving and shielding the screw shank, and supports at one end an open ended casing for receiving and shielding the screw head and a key-operated lock for locking the screw against rotation; the said housing and the casing are separated by a partition having an opening, and the screw shank extends from the casing into the housing through such opening. The screw shank is engaged in a threaded bore in the leg, whereby the screw, when rotated, urges the leg and thereby the motor forward and one base end of the body backwards against the inboard transom side, thereby clamping the motor firmly to the transom, and when the screw then is locked, the screw is non-rotatable, shielded and substantially inaccessible and thus safely protected.

6 Claims, 3 Drawing Figures

ANTI-THEFT DEVICE FOR OUTBOARD MOTORS

FIELD OF INVENTION

The present invention relates to an anti-theft device for clamping and locking a boat motor, especially an outboard motor, to a transom board or similar motor mount.

BACKGROUND OF THE INVENTION

Outboard motors are usually supported on the upper edge of the transom board to which they are clamped by means of a fork-shaped bracket and a screw fixture. The bracket which may be fixedly connected with the motor comprises a web extending inwardly from the motor over the upper edge of the transom board and a free leg extending downwardly on the inboard side of the transom. By means of a clamping screw acting between the transom board and the bracket leg located on the inboard side of said transom, said bracket leg can be urged inwardly, i.e. in a direction away from the inboard transom side, whereby an upper supporting surface connected with the motor is urged against the outboard transom side for clamping the motor to the transom. In other words, the device functions substantially in the same manner as a screw jack.

To prevent theft of the motor, a locking device is required, and it is previously known to provide, in conjunction with the bracket, a lock which is locked condition is to prevent the unauthorized release of the bracket and thus the removal of the motor from the transom.

Prior art locking devices suffer from several disadvantages, the most serious being that the screw of the clamping device, after the motor has been clamped in position, is accessible to a hacksaw blade which is inserted in the space between the inboard transom side and the bracket leg located inwardly thereof. As a result, it is frequently quite easy to saw off the screw and thus to release the motor.

Another disadvantage of the known devices resides in that the clamping screw acts directly between the bracket and a punctiform surface on the inner transom side. In view hereof, this punctiform surface usually is reinforced by means of a fitting mounted on the inner transom side. Although the fitting protects the transom from being damaged by the screw end, it is itself subjected to point loads. Moreover, if the fitting can be released when the motor is held in position by the clamping device and the lock is locked, it is possible, at least in some instances, to lift the motor and the bracket upwards from the transom because the fitting is capable of sliding on the inner side of the transom.

Known locking devices usually are designed exclusively for making the head of the clamping screw—when the locking device is locked—inaccessible to a wrench or other tool by which the screw can be removed. In some instances, the screw has no head but instead a threaded outer end portion with a nut protected by the lock against tampering. If the lock can be rotated relative to the bracket, such that the screw or nut can be rotated by means of the lock, the lock naturally serves no purpose. It is therefore necessary somehow to prevent rotation of the lock relative to the bracket. This can be achieved, for instance, by welding the screw head to the bracket, but this is an impractical solution both from the viewpoint of mounting and dismounting because the locking device via the bracket is bound to the motor itself.

SUMMARY OF THE INVENTION

The present invention aims at providing a clamping device which obviates the above-mentioned difficulties and is of simple and robust construction and, furthermore, can be used with most clamping devices comprising a bracket and a screw, without necessitating modification thereof.

To this end, the clamping fixture according to the present invention is in the form of a screw jack which comprises, in addition to said clamping screw, a hollow body forming a protective housing for receiving and shielding the screw shank and, connected to one end of the housing, an open ended protective casing for receiving and shielding the screw head as well as a key-operated lock mounted therein for cooperation with the screw head for locking the screw against rotation; said protective housing comprises in an upper wall thereof an opening for receiving an end portion of said leg and said hollow body comprises a partition between said housing and said casing, said partition having an opening in a coaxial position relative to the common longitudinal axis of said housing and said casing, said end portion of said leg having a threaded bore for receiving and engaging the screw shank; and wherein the screw shank extends from the casing into the housing through said opening formed in said partition, the end of said hollow body opposite to said casing forming a base adapted to bear against the inboard transom side, the screw head being adapted to bear against said partition and the screw shank extending through and engaging the threaded bore in said end portion of the shank, whereby the screw, when being rotated, urges said bracket leg and thereby the outboard motor forward and said base end of the hollow body backwards against the inboard side of the transom thereby clamping the motor firmly to the transom, and when the screw then is locked, the screw is non-rotatable, shielded and substantially inaccessible and thus safely protected.

BRIEF DESCRIPTION OF DRAWING

The invention will be described in more detail below, reference being made to the accompanying drawings which illustrate a preferred embodiment of the invention and in which.

DETAILED DESCRIPTION OF THE EMBODIMENTS

Figure 1:
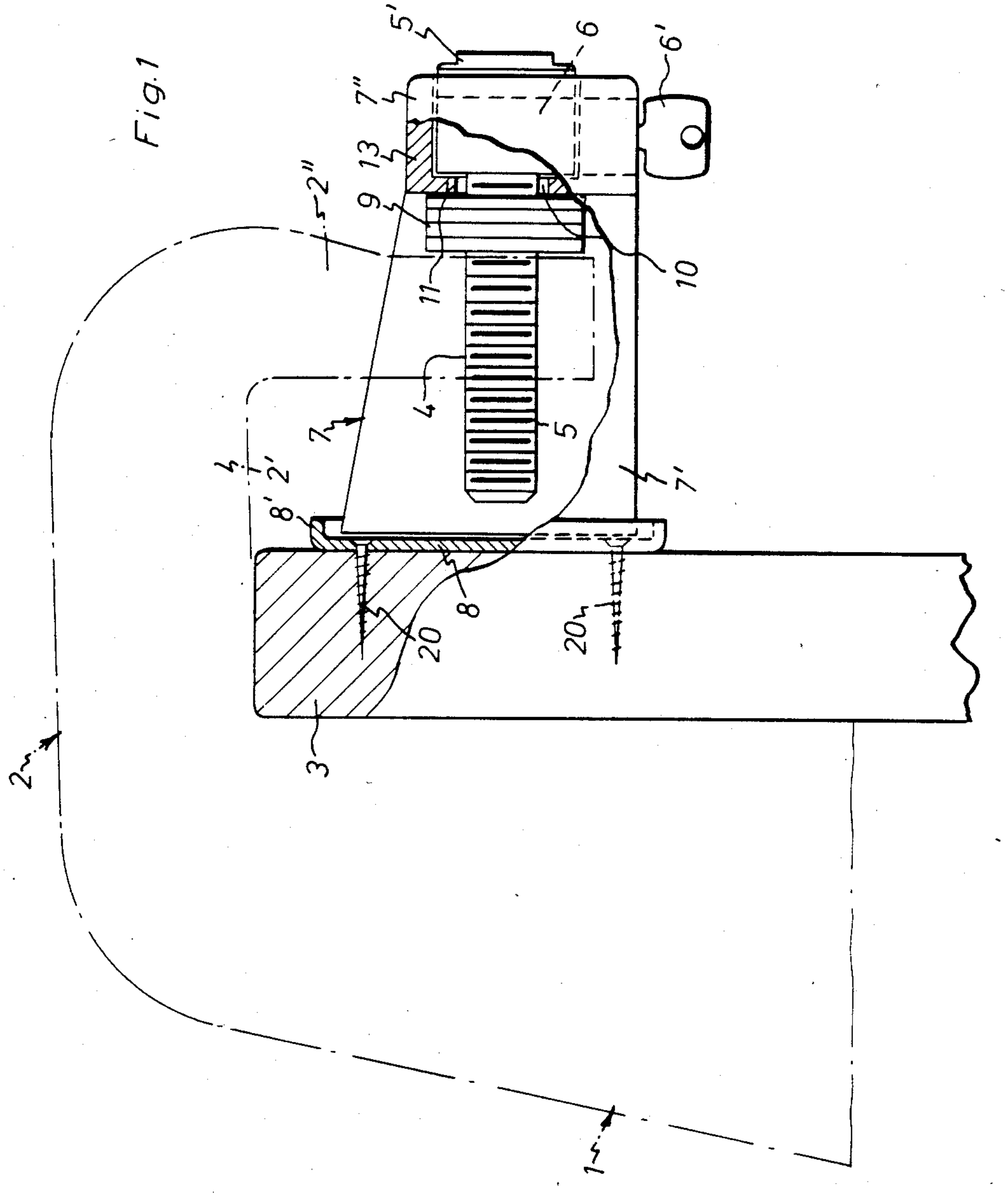
FIG. 1 illustrates schematically a part of an outboard motor which, by means of a suspension and clamping bracket, is mounted on the transom board of a boat and is clamped and locked relative to the transom board by means of a device which according to the invention cooperates with the bracket and is illustrated partly in longitudinal section.

FIG. 1 illustrates schematically the upper part of an outboard motor 1 connected with a schematically illustrated mounting bracket 2 which comprises a web 2' extending in over the upper edge of the transom board 3 of a boat equipped with the motor 1, and a free leg 2" projecting from the web and extending downwardly parallel to and spaced from the inboard transom side 3. The bracket leg 2" has a threaded bore 4 for accommodating a clamping screw 5.

The device according to the invention comprises a clamping fixture 7 which forms a screw jack comprising the clamping screw 5 and a hollow body. The main part of the hollow body is substantially U-shaped in cross section, and this part forms a protective housing 7' for the threaded shank of the clamping screw, and an outer end portion of the hollow body forms a protective casing 7" for the screw head 5' and for the keyoperated lock 6 of, for example, conventional cylinder type. This lock is mounted in the casing 7" to permit secure locking of the clamping screw when the clamping fixture bears and is urged, by means of the clamping screw, against the inboard side of the transom 3 via a protective fitting 8 secured to the transom board. The casing 7" is supported by the housing 7' at the end thereof opposite to the transom board. The screw 5, when inserted with its head into the casing 7", extends with its shank through the threaded bore 4 formed in the bracket leg 2" and into the housing 7'. A number of spacers 9 are mounted on the screw shank between the bracket leg 2" and the casing 7" which is fixed to or formed as an extension of the housing 7'. The housing 7' is separated from the casing 7" by means of a transverse wall 11 which forms a partition therebetween and has a bore 10 through which the clamping screw extends into the housing 7'. The screw 5 has a relatively large head 5' which bears against the partition 11. The casing 7" including the wall member 11 is preferably formed by a sturdy metal block having a cylindrical bore 14 for receiving the screw head and a cylindrical, transverse bore 12 which extends through one side wall of said block or casing 7" and penetrates into its opposite side wall where it ends at a bottom 13. The bore 14 is dimensioned to accommodate the cylindrical screw head 5' and is formed laterally offset relative to the longitudinal axis of the bore 12 and perpendicular thereto.

Figure 2:
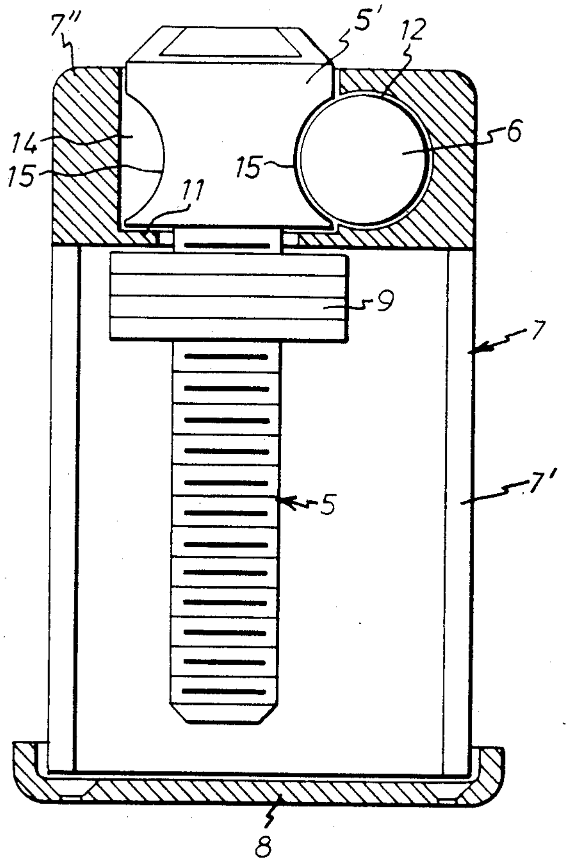
FIG. 2 illustrates the device according to the invention on a larger scale as seen from above with respect to FIG. 1 and partly in longitudinal section.

In the cylindrical circumference of the screw head 5', two relatively diametrical recesses 15 are formed, defined by part-cylindrical surfaces. The bores 10, 14 receiving the lock 6 and screw head 5', respectively, are so formed and dimensioned and the distance between their relatively perpendicular longitudinal axes is so selected that the bore 14 intersects the partition between this bore 14 and the bore 12 at 16 (see FIG. 3). When the screw 5 has been inserted with the screw head 5' in the bore 14 and one of the recesses 15 in the screw head 5' is facing the above-mentioned intersection, the surface defining that recess forms, within this area, a part of a continuous cylindrical surface whose other part is formed by that portion of the circumferential surface of the bore 12 which is not cut away by the intersection 16. The lock cylinder 6 may thus be inserted in position only when one of the recesses 15 in the screw head 5' is facing the bore 12 for the lock cylinder. It appears from FIG. 2 that the clamping screw 5 can neither be rotated nor removed after insertion of the lock cylinder 6.

The lock 6 is a standard lock, for instance of a type intended and used for blocking and locking the cartridge chamber of a rifle. After insertion of the lock cylinder 6 and locking the lock by means of a key 6', the lock cylinder thus cannot be removed from the casing 7" because of the interengagement of a locking member, such as a bolt 17 and a recess 18 in the inner periphery of the bore 12.

However, the above-mentioned locking device forms only a part of the invention. The most important aspect of the invention is the function of the clamping fixture 7 which may be said to form a screw jack, and its significance as part of the clamping and locking device according to the invention.

Figure 3:
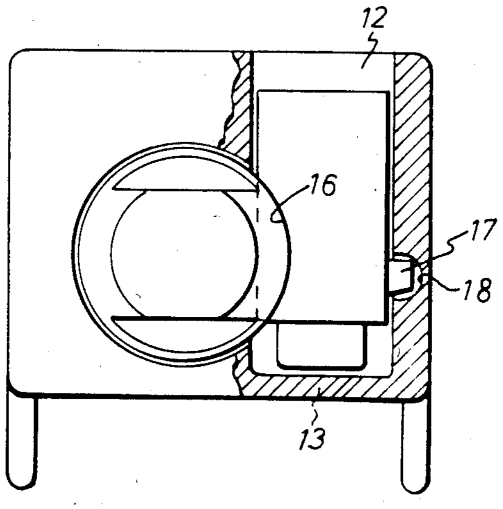
FIG. 3 is, partly in cross-section, an end view of the device illustrated in FIG. 2.

In the preferred embodiment and as is evident from the foregoing, the main part of the clamping fixture 7 is in the form of a housing 7' which is substantially U-shaped in cross-section and which, with respect to FIG. 1, has its open side facing upwardly and protects the clamping screw with opposite side walls and a bottom wall. However, the housing may have a suitable number of side walls, for instance four side walls forming equally large angles relative to one another and enclosing the circumference of a truncated cone having about one half of its circumference broken away. The side walls could be replaced by a wall which is circular in cross-section and a sufficient opening in one side to permit insertion of the bracket leg 2". Other shapes are also conceivable. The portion 7" of the clamping fixture 7 forming a protective casing for the screw head and the locking device 6 may consist of a monolithic block in which the bores 10, 14 are formed, but it may also be a composite welded structure. The housing 7 may be truncated with the wider base end facing the transom board 3 and supporting at its smaller end the casing 7". The upwardly open side (FIG. 1) which is shown facing downwardly in FIG. 3, is sufficiently wide to permit the clamping fixture 7 to be displaced upwardly so that the side walls of the housing 7' straddle the bracket leg and permit insertion of the screw through the bore 4 of the bracket leg. In the embodiment illustrated in FIG. 1, the clamping fixture 7 bears against the transom board 3 via the plate 8 which is provided with a collar 8' directed away from the transom board. The plate 8 is secured to the transom board by a number of screws 20 whose heads are located within the circumference of the base of the clamping fixture 7, whereby the screws 20 are inaccessible when the clamping fixture is locked in position.

It should be noted that the clamping screw 5 does not extend into engagement with the plate 8, but terminates at a distance therefrom. Thus, in the arrangement according to the invention, the clamping force is transmitted from the bracket leg 2" to the transom board via the clamping fixture 7 proper. When the clamping screw 5 is set, the base of the clamping fixture 7 is urged against the transom board via the plate 8, and at the same time the bracket leg 2" is urged in the opposite direction, i.e. towards the bow. The clamping force exerted on the transom board 3 is distributed over a relatively large area, and to be able to detach the device the housing 7" must be sawn through in the transverse direction in the area between the block or casing 7" and the bracket leg 2". If the housing 7 is made of hardened steel, which is preferred, a cutting operation carried out by means of a hacksaw cannot possibly be done in what an unauthorised person would regard as a reasonable length of time. The screw 5 is practically inaccessible to a direct attack by a hacksaw blade, and furthermore an unauthorised person stands nothing to gain by cutting the screw 5 inside of the bracket leg 2". Between the bracket leg 2" and the casing 7", the screw is inaccessible because the upper opening in the housing is too narrow and because also the steel spacers 9 form a protection.

Modifications of the device according to the invention in respect of its construction details are, of course, possible. For example, the portion of the clamping fixture 7 which forms the housing 7' need not be open in its upper side within the area between the transom board or the plate 8 and bracket 2". If the circumferential walls of the housing form a closed structure within this area, it may be even more difficult to saw through the housing, but the housing is deemed to be sufficiently strong in the embodiment described to discourage an unauthorised person from trying to cut it.

As will appear from FIG. 1, the lock cylinder 6 is located such that the keyhole is facing downwards. In this manner, the lock will be protected against rain and sea-water, in contrast to, for instance, such locks in which the keyhole is facing the bow. Water carried into the housing 7 from above can be led off through drain holes in the underside of the housing.

In the device according to the invention, the screw head is adequately protected by the strong screw head and lock casing 7", and the engagement between the lock cylinder 6 and one of the recesses 15 in the screw head is extremely powerful and cannot be forced without having access to a key or picklock. Naturally, however, one should choose a tamper-proof lock, or at least a lock which requires great skill and patience of anyone trying to force it. Because the keyhole is facing downwards, any attempt at picking the lock is further complicated because it is difficult of access.

What we claim and desire to secure by Letters Patent is:

1. An anti-theft device for clamping and locking an outboard motor to a transom board and comprising a bracket, means connecting said bracket with an upper part of the outboard motor, said bracket forming with said part a substantially U-shaped suspension rack for mounting the outboard motor on the transom in a depending position adjacent the outboard side thereof and with one leg of the bracket extending down on the inboard side of the transom, and a clamping fixture including a clamping screw for urging said leg of the bracket away from the inboard side of the transom while clamping the motor to the outboard side thereof; wherein the clamping fixture is in the form of a screw jack which comprises, in addition to said clamping screw, a hollow body forming a protective housing for receiving and shielding the screw shank and, connected to one end of the housing, an open ended protective casing for receiving and shielding the screw head as well as a key-operated lock mounted therein for cooperation with the screw head for locking the screw against rotation; said protective housing comprises in an upper wall thereof an opening for receiving an end portion of said leg and said hollow body comprises a partition between said housing and said casing, said partition having an opening in a coaxial position relative to the common longitudinal axis of said housing and said casing, said end portion of said leg having a threaded bore for receiving and engaging the screw shank; and wherein the screw shank extends from the casing into the housing through said opening formed in said partition, the end of said hollow body opposite to said casing forming a base adapted to bear against the inboard transom side, the screw head being adapted to bear against said partition and the screw shank extending through and engaging the threaded bore in said end portion of the shank, whereby the screw, when being rotated, urges said bracket leg and thereby the outboard motor forward and said base end of the hollow body backwards against the inboard side of the transom thereby clamping the motor firmly to the transom, and when the screw is then locked, the screw is non-rotatable, shielded and substantially inaccessible and thus safely protected.

2. A device as claimed in claim 1 and wherein the outer end of said clamping screw shank, after the clamping screw has been maximally set, is situated at a point between said leg end portion and said base of the housing to be spaced from said transom board when the outboard motor is securely fixed to the latter by means of said clamping fixture in cooperation with said bracket.

3. A device as claimed in claim 1 and wherein said hollow body along at least a main portion thereof which forms said protective housing, has a U-shaped profile having its open side facing upwardly.

4. A device as claimed in claim 1 and wherein said hollow body along at least a main portion thereof which forms said protective housing has a C-shaped profile having its open side facing upwardly.

5. A device as claimed in claim 1 and comprising means forming a protective sleeve mounted on a part of said clamping screw shank situated between said casing and said leg end portion which extends into said housing.

6. A device as claimed in claim 5 and wherein said protective sleeve is in the form of an assemblage of spacers.

* * * * *